(12) United States Patent
Fung et al.

(10) Patent No.: US 9,475,389 B1
(45) Date of Patent: Oct. 25, 2016

(54) SYSTEM AND METHOD FOR CONTROLLING A VEHICLE DISPLAY BASED ON DRIVER BEHAVIOR

(71) Applicant: Honda Motor Co., Ltd., Tokyo (JP)

(72) Inventors: Kin C. Fung, Dublin, OH (US); Timothy J. Dick, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/744,247

(22) Filed: Jun. 19, 2015

(51) Int. Cl.
*G06F 7/70* (2006.01)
*B60K 35/00* (2006.01)

(52) U.S. Cl.
CPC .......... *B60K 35/00* (2013.01); *B60K 2350/352* (2013.01)

(58) Field of Classification Search
CPC ...................................................... B60K 35/00
USPC .......................................................... 701/36
See application file for complete search history.

(56) References Cited

U.S. PATENT DOCUMENTS

| | | |
|---|---|---|
| 6,256,558 B1 | 7/2001 | Sugiura et al. |
| 6,668,221 B2 | 12/2003 | Harter, Jr. et al. |
| 8,106,783 B2 | 1/2012 | Wada et al. |
| 8,471,909 B2 | 6/2013 | Ishikawa |
| 2004/0088095 A1 | 5/2004 | Eberle et al. |
| 2005/0155808 A1 | 7/2005 | Braeuchle et al. |
| 2007/0159344 A1* | 7/2007 | Kisacanin ........... G06K 9/00362 340/576 |
| 2010/0250044 A1 | 9/2010 | Alasry et al. |
| 2011/0246028 A1 | 10/2011 | Lisseman et al. |
| 2012/0215403 A1* | 8/2012 | Tengler ................. B60W 50/12 701/36 |
| 2012/0290215 A1 | 11/2012 | Adler et al. |
| 2013/0063336 A1* | 3/2013 | Sugimoto .............. B60K 35/00 345/156 |
| 2013/0124038 A1 | 5/2013 | Naboulsi |
| 2013/0245886 A1* | 9/2013 | Fung ...................... B60K 28/06 701/36 |
| 2014/0148988 A1 | 5/2014 | Lathrop et al. |
| 2014/0306814 A1* | 10/2014 | Ricci ..................... H04W 48/04 340/425.5 |
| 2016/0009411 A1* | 1/2016 | Davalos ................ B64D 47/02 345/156 |
| 2016/0084661 A1* | 3/2016 | Gautama ................ G06T 11/60 701/400 |

FOREIGN PATENT DOCUMENTS

DE  102006050017  4/2008

OTHER PUBLICATIONS

Video: "CES 2015—Seeing Machines: The Future of Automotive Safety" https://www.youtube.com/watch?v=obPnLufAu7o, printed Jun. 18, 2015.
International Search Report and Written Opinion of PCT/US2015/037019 dated Nov. 2, 2015, 12 pages.

* cited by examiner

*Primary Examiner* — Hussein A. Elchanti
(74) *Attorney, Agent, or Firm* — Rankin, Hill & Clark LLP

(57) ABSTRACT

A computer-implemented method and system for controlling a vehicle display in a vehicle. The method includes receiving contact data from a steering wheel, the contact data indicating driver contact with the steering wheel. The method includes determining a head vector based on information received from a head tracking device, the head vector defining a line originating from a head reference point, the line extending in a direction towards a viewing point. The method includes determining a fixation duration towards the viewing point based on the head vector and the information received from the head tracking device. Further, the method includes controlling the vehicle display based on the contact data, the head vector, and the fixation duration.

19 Claims, 11 Drawing Sheets

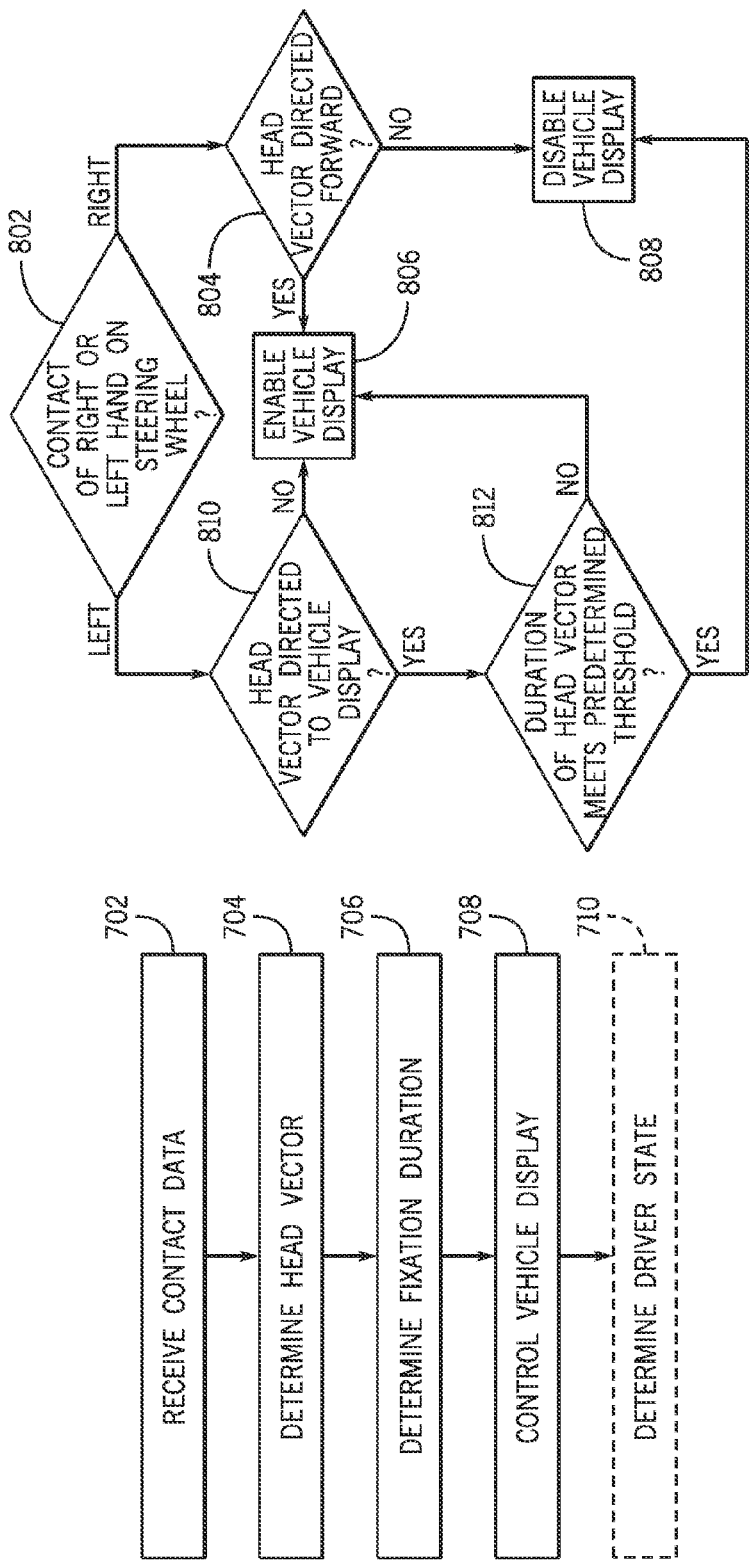

SYSTEM AND METHOD FOR CONTROLLING A VEHICLE DISPLAY BASED ON DRIVER BEHAVIOR

BACKGROUND

The rapid increase of new information systems and functionalities that can be used within vehicles can increase driver distraction while driving. Drivers are often unaware of the effects that this distraction can have on their own abilities for vehicle control. Driver behavior can indicate whether the driver is distracted while driving. Controlling vehicle systems, for example, a vehicle display can be based on driver behavior. Control of vehicle systems should balance driver safety while still allowing for appropriate use of certain vehicle systems.

BRIEF DESCRIPTION

According to one aspect, a computer-implemented method for controlling a vehicle display in a vehicle includes receiving contact data from a steering wheel, the contact data indicating driver contact with the steering wheel. The method includes determining a head vector based on information received from a head tracking device, the head vector defining a line originating from a head reference point, the line extending in a direction towards a viewing point. The method includes determining a fixation duration towards the viewing point based on the head vector and the information received from the head tracking device. The method includes controlling the vehicle display based on the contact data, the head vector, and the fixation duration.

According to another aspect, a system for controlling a vehicle display in a vehicle includes a steering wheel. The steering wheel includes sensors for sensing contact data, the contact data indicating driver contact with the steering wheel. The system includes a head tracking device for determining a head vector of the driver with respect to the vehicle and the vehicle display. The head vector defines a line originating from a head reference point. The line extends in a direction towards a viewing point for a fixation duration. The system includes a processor operatively connected for computer communication to the vehicle display, the steering wheel, and the head tracking device, the processor including a vehicle control display module for controlling the vehicle display based on the contact data and the head vector.

According to a further aspect, a non-transitory computer readable medium comprising instructions that when executed by a processor perform a method for controlling a vehicle display in a vehicle. The method includes receiving contact data from a steering wheel, the contact data indicating driver contact with the steering wheel. The method includes determining a head vector of the driver based on information received from a head tracking device, the head vector defining a line originating from a head reference point, the line extending in a direction towards a viewing point for a fixation duration. The method includes determining a number of head vector sequences based on the head vector and information received from the head tracking device. Further, the method includes executing control of the vehicle display based on at least one of the contact data, the head vector, and the number of head vector sequences.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 7 is a process flow diagram of a method for controlling a vehicle display based on driver behavior according to an exemplary embodiment;

FIG. 8 is a process flow diagram of an illustrative example of the method for controlling a vehicle display based on driver behavior of FIG. 7 according to an exemplary embodiment;

Figure 1:
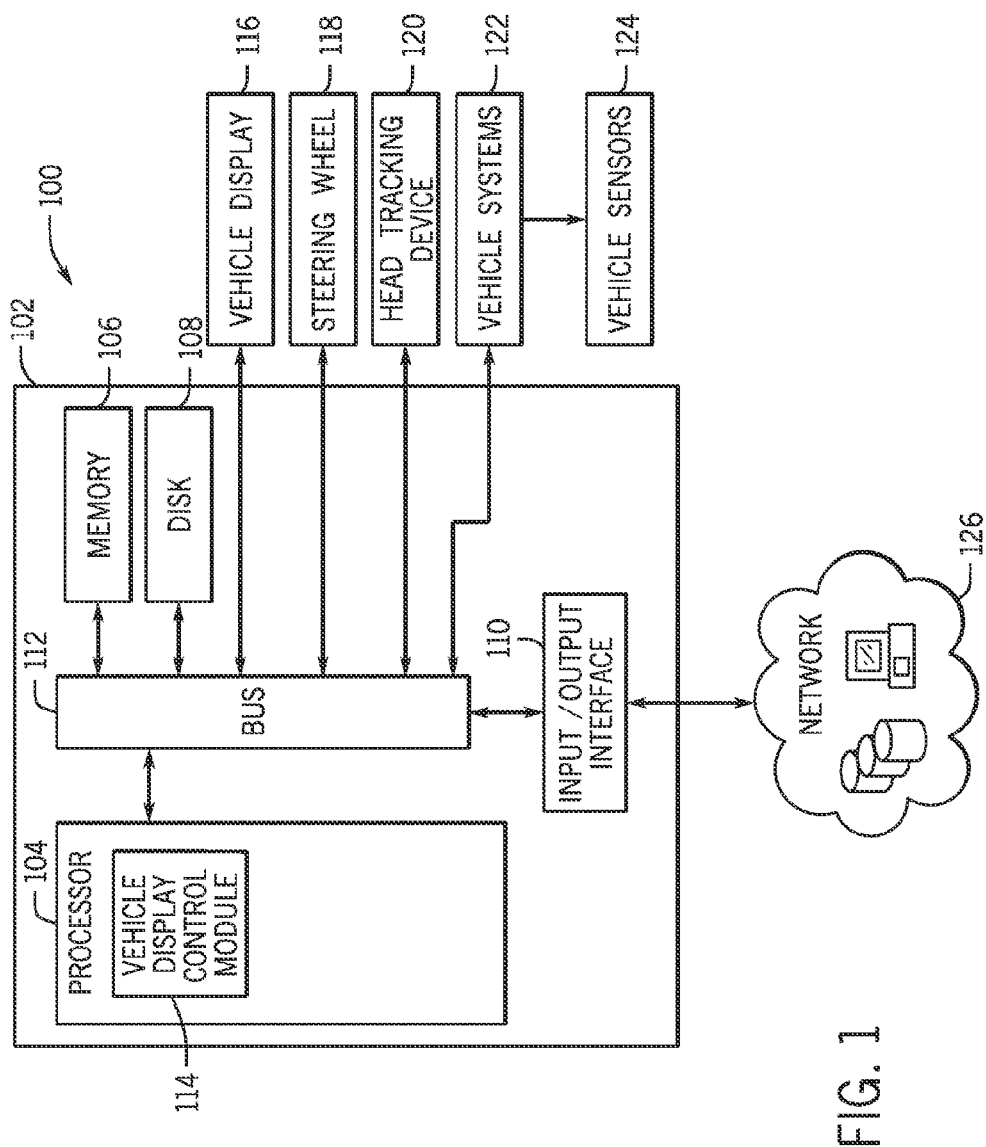
FIG. 1 a block diagram of an operating environment for implementing systems and methods for controlling a vehicle display based on driver behavior according to an exemplary embodiment.

11A but illustrating another distance between the target vehicle and the host vehicle according to an exemplary embodiment.

DETAILED DESCRIPTION

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input) from a user. The display can be located in various locations of the vehicle, for example, on the dashboard or center console. In some embodiments, the display is part of a portable device (e.g., in possession or associated with a vehicle occupant), a navigation system, an infotainment system, among others.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, an automatic cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones, personal wellness devices, collars, and leashes.

Figure 2:
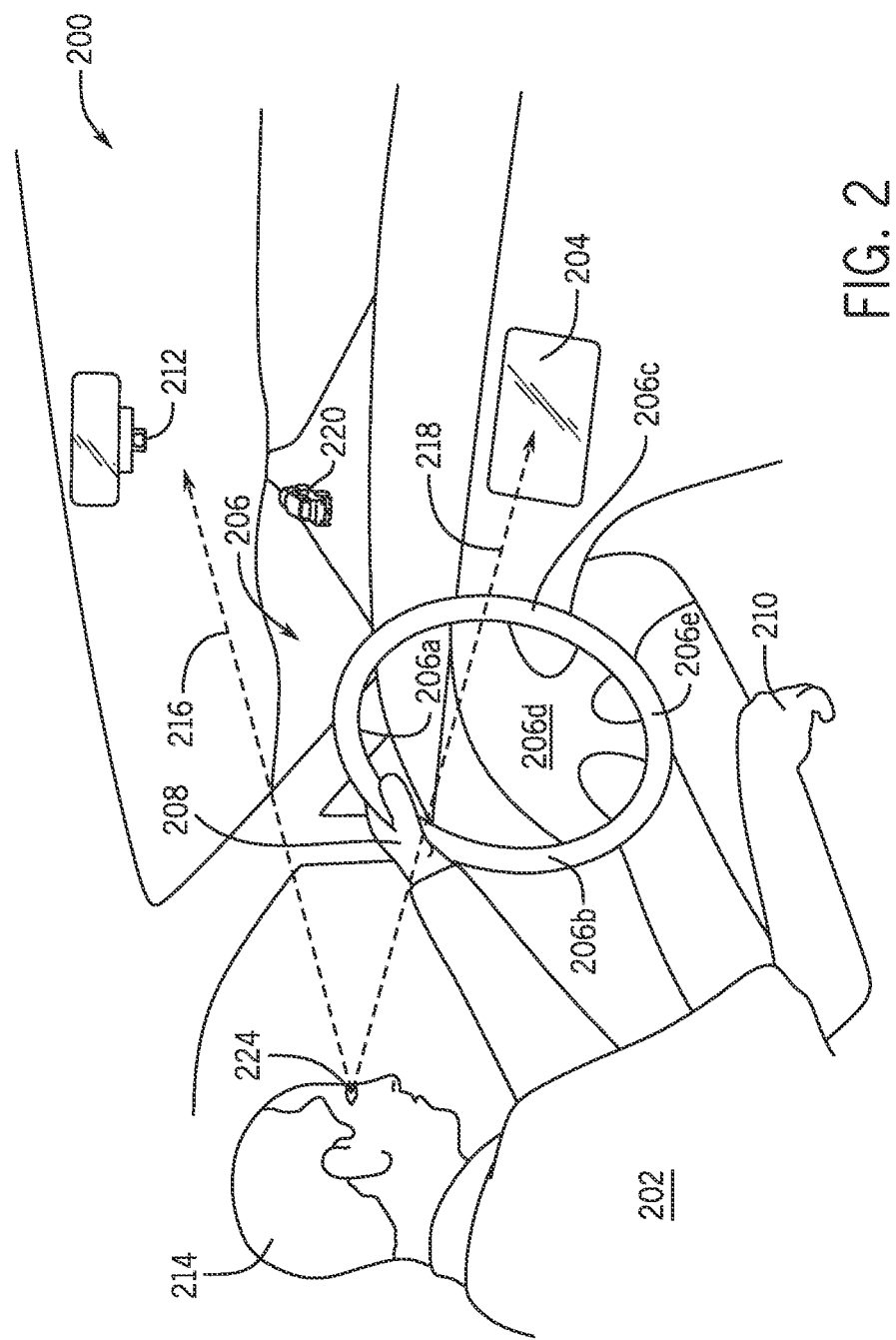
FIG. 2 is a schematic diagram and illustrative example of a vehicle implementing systems and methods for controlling a vehicle display based on driver behavior according to an exemplary embodiment.

Generally, the systems and methods disclosed herein are directed to controlling a vehicle display in a vehicle based on driver behavior, for example, contact between the steering wheel and the driver and head pose of the driver. Referring now to the drawings, wherein the showings are for purposes of illustrating one or more exemplary embodiments and not for purposes of limiting same, FIG. 1 is a block diagram of an operating environment 100 for implementing systems and methods for controlling a vehicle display based on driver behavior. The components of operating environment 100, as well as the components of other systems, hardware architectures, and software architectures discussed herein, can be combined, omitted, or organized into different architectures for various embodiments. Further, the components of the operating environment 100 can be implemented with or associated with a vehicle. For example, FIG. 2 is a schematic diagram of a vehicle 200 operated by a driver 202, the vehicle 200 implementing systems and methods for controlling a vehicle display based on driver behavior according to an exemplary embodiment.

In the illustrated embodiment of FIG. 1, the operating environment 100 includes a vehicle computing device 102 (VCD) with provisions for processing, communicating and interacting with various components of a vehicle and other components of the operating environment 100. In one embodiment, the VCD 102 can be implemented with the vehicle 200 (FIG. 2), for example, as part of a telematics unit, a head unit, a navigation unit, an infotainment unit, an electronic control unit, among others. In other embodiments, the components and functions of the VCD 102 can be implemented remotely from the vehicle 200, for example, with a portable device (not shown) or another device operably connected for computer communication connected to the vehicle.

The VCD 102 includes a processor 104, a memory 106, a disk 108, and an input/output (I/O) interface 110, which are each operably connected for computer communication via a bus 112 and/or other wired or wireless protocols. The I/O interface 110 provides software, firmware, and/or hardware to facilitate data input and output between the components of the VCD 102, the components of the operating environment 100, and other components, networks, and data sources, which will be described herein. Additionally, the processor 104 includes a vehicle display control module 114, suitable for providing control of a vehicle display, for example, a vehicle display 116, based on driver behavior.

As mentioned above, the operating environment 100 includes the vehicle display 116. More specifically, the VCD 102 is operably connected for computer communication (e.g., via the bus 112 and/or the I/O interface 110) to the vehicle display 116. As described above, the vehicle display 116 can be any type of input/output device displaying information in a vehicle and allowing interaction between the device and a vehicle occupant. In FIG. 2, a schematic illustration of a vehicle display is shown by element number 204. It is understood that in some embodiments, the vehicle display 116 can be a part of a portable device (not shown) located in the vehicle. For example, a display and/or interface of a smartphone executing a navigation application.

The VCD 102 is also operably connected for computer communication (e.g., via the bus 112 and/or the I/O interface 110) to a steering wheel 118. In one embodiment, the steering wheel 118 is a touch steering wheel capable of providing contact data, for example, data about the contact and location (e.g., location of contact) of the driver's hands with respect to the steering wheel 118 to the processor 104. It is understood that the contact data could also include data about the contact and location (e.g., location of contact) of another part (e.g., appendage) of the driver's body, for example, an elbow, a knee, a foot, among others.

The steering wheel 118 can be a capacitive touch steering wheel including sensors (e.g., capacitive sensors, electrodes) (not shown) located within or on the steering wheel 118. The sensors can measure driver contact with the steering wheel 118 and a location of the contact. In some embodiments, the sensors can determine if the driver (e.g., driver's hands) is in contact with the front and/or back of the steering wheel 118 (e.g., gripped and wrapped around the steering wheel). In FIG. 2, an illustrative example of a steering wheel is shown as steering wheel 206. In this example, the steering wheel 206 has a top portion 206a, a left side portion 206b, a right side portion 206c, a center portion 206d, and a bottom portion 206e. Each of these portions (i.e., the front, back and/or side surfaces of each portion on the steering wheel) can be in contact the driver 202. In FIG. 2, a left hand of the driver 202 and a right hand of the driver 202 are shown in contact with the steering wheel 206.

Figure 3A:
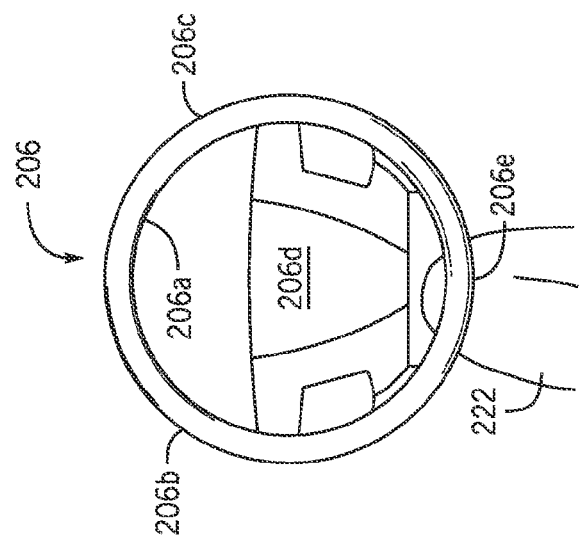
FIG. 3A is a schematic diagram of an illustrative example of driver contact with the steering wheel according to an exemplary embodiment.
Figure 3B:
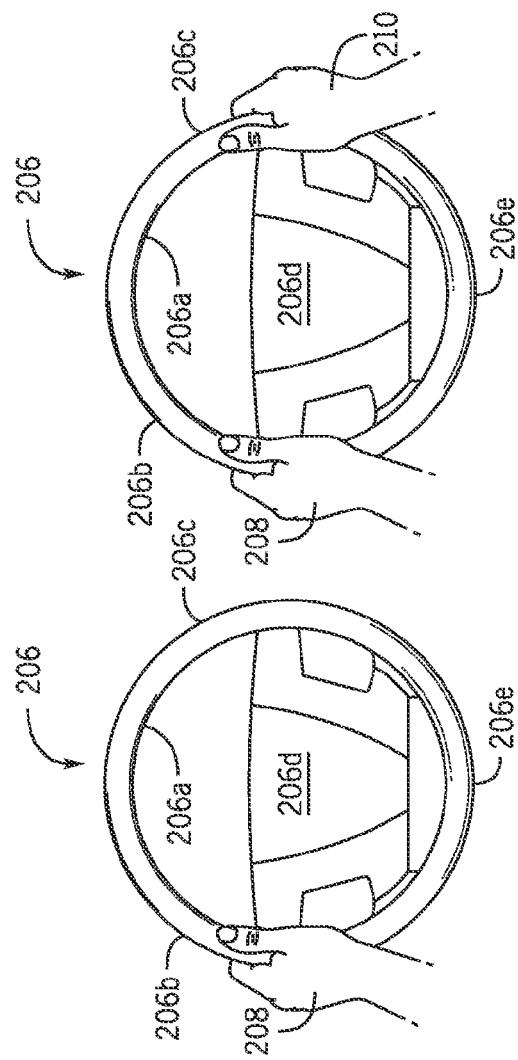
FIG. 3B is a schematic diagram of another illustrative example of driver contact with the steering wheel according to an exemplary embodiment.
Figure 3C:
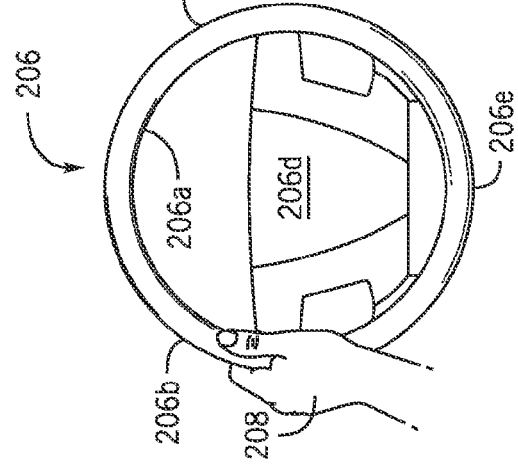
FIG. 3C is a schematic diagram of a further illustrative example of driver contact with the steering wheel according to an exemplary embodiment.

Other illustrative examples of contact between the driver and the steering wheel are shown in FIGS. 3A, 3B, and 3C. For simplicity, like numerals in FIGS. 2, 3A, 3B, and 3C indicate like parts. It is understood that driver contact can include contact between an appendage of the driver (e.g., hands, knees, feet, elbows, shoulder) and the steering wheel. FIG. 3A illustrates exemplary driver contact of the left hand 208 in contact with the steering wheel 206. In FIG. 3B, illustrates exemplary driver contact is shown with the left hand 208 and the right hand 210 in contact with the steering wheel 206. Further, FIG. 3C illustrates exemplary driver contact of a knee 222 in contact with the back of the steering wheel 206. It is understood that the examples of driver contact shown in FIGS. 3A, 3B, and 3C are exemplary in nature and that other examples of driver contact and other locations of contact are contemplated. It is also understood, that in some examples, no driver contact can be determined. For example, in one embodiment there can be no driver contact, for example, if the driver has no hands in contact with the steering wheel.

Referring again to FIG. 1, VCD 102 is also operably connected for computer communication (e.g., via the bus 112 and/or the I/O interface 110) to a head tracking device 120. The head tracking device 120 can sense and provide head vector information (e.g., position, orientation, focal point, duration of fixation) of the driver. This information can be transmitted by the head tracking device 120 to the processor 104. In one embodiment, the head tracking device 120 includes one or more optical sensing devices (e.g., digital camera, video camera, infrared sensor, laser sensor) to capture head vector information. In other embodiments, the head tracking device 120 includes a thermal sensing device and/or proximity sensors to capture head vector information. In FIG. 2, an optical sensing device 212 (e.g., a video camera) can capture head vector information associated with the head 214 of the driver 202.

Figure 4:
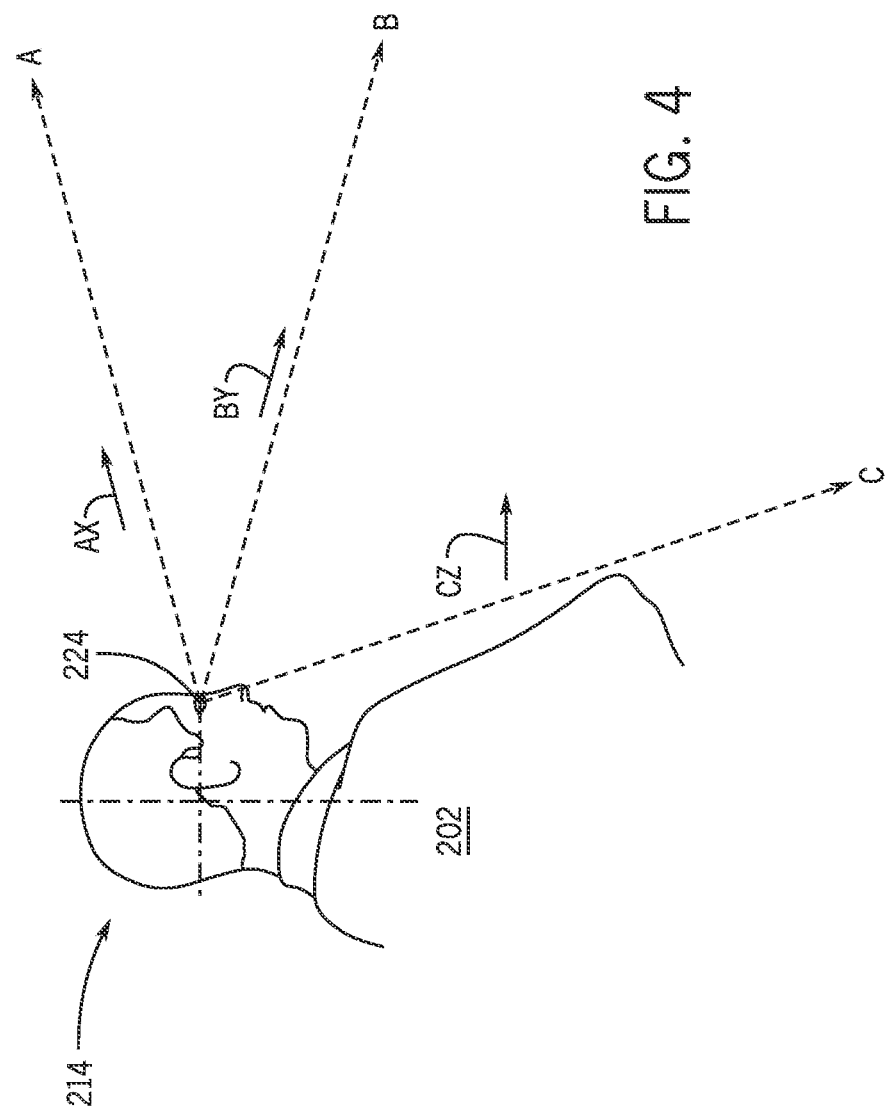
FIG. 4 is a schematic diagram of a head reference frame and exemplary head vectors according to an exemplary embodiment.

Head vector information will now be described in more detail with reference to FIG. 4. For simplicity, like numerals in FIG. 2 and FIG. 4 indicate like parts. FIG. 4 illustrates a schematic diagram of a head reference frame and exemplary head vectors according to an exemplary embodiment. In this example, the head reference frame is with respect to the head 214 of the driver 202 and the vehicle (not shown). In one embodiment, the head vector defines a line originating from a head reference point, the line extending in a direction towards a viewing point. In FIG. 4, three exemplary head vector lines are shown originating from a head reference point 224. It is understood that other embodiments can include a head reference point in a different location and can include head vector lines extending in various other directions to different viewing points. Further, in some embodiments, a viewing point could be a location of focus on an object (e.g., a vehicle display, a rear-view mirror, a target vehicle, an area outside the vehicle). Referring again to FIG. 4, vector AX extends in a direction (e.g., towards an upward forward direction of the vehicle) to a viewing point A. Vector BY extends in a direction (e.g., towards a forward way of the vehicle) to a viewing point B. Vector CZ extends in a direction (e.g., toward a downward and right way of the vehicle) to a viewing point C.

In one embodiment, the viewing point B, directed toward a forward way of the vehicle, indicates a viewing point forward, towards the road in front of the vehicle 200 and the driver 202. Further, in another embodiment, the viewing point C, directed toward a downward and right way of the vehicle, indicates a viewing point on a vehicle display (e.g., vehicle display 204, FIG. 2). In some embodiments, the head vector information can include a fixation duration towards the viewing point. The fixation duration can be a period of time in which the head vector is focused (e.g., fixated) on the viewing point. It is further understood that the head vector of the driver can be used to approximate eye gaze of the driver and that other devices and technologies for tracking and measuring head pose, head vector, and eye gaze can be implemented with the systems and methods discussed herein.

Referring again to FIG. 1, VCD 102 is also operably connected for computer communication (e.g., via the bus 112 and/or the I/O interface 110) to one or more vehicle systems 122 and sensors 124. Vehicle systems 122 can include, but are not limited to, any automatic or manual systems that can be used to enhance the vehicle, driving, and/or safety. Further, it is understood that the vehicle display 116, the steering wheel 118 and the head tracking device 120 can also be considered vehicle systems 122 including sensors 124. The sensors 124 of the provide and/or sense information associated with one or more vehicle occupants, the vehicle, the vehicle environment, and/or the vehicle systems. It is understood that the vehicle sensors can include, but are not limited to, vehicle sensors associated with specific vehicle systems and other vehicle sensors associated with the vehicle. Specific vehicle system sensors can include, but are not limited to, vehicle speed sensors, accelerator pedal sensors, brake sensors, throttle position sensors, wheel sensors, anti-lock brake sensors, camshaft sensors, among others. Other vehicle sensors can include, but are not limited to, cameras mounted to the interior or exterior of the vehicle and radar and laser sensors mounted to the exterior of the vehicle. Further, vehicle sensors can include sensors external to the vehicle and accessed, for example, via a network. These sensors can include external cameras, radar and laser sensors on other vehicles in a vehicle-to-vehicle network, street cameras, and surveillance cameras, among others.

It is understood that the vehicle sensors 124 are operable to sense a measurement of data associated with the vehicle, the vehicle environment, the vehicle systems 122, and/or occupants of the vehicle, and generate a data signal indicating the measurement of data. These data signals can be converted into other data formats (e.g., numerical) and/or used by the vehicle systems 122 and/or the VCD 102 (e.g., the processor 104) to generate other data metrics and parameters. It is understood that the sensors can be any type of sensor, for example, acoustic, electric, environmental, optical, imaging, light, pressure, force, thermal, temperature, proximity, among others.

As mentioned above, the VCD 102 is also operatively connected for computer communication to a network 126. It is understood that the connection from the I/O interface 110 to the network 126 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. The network 126 is, for example, a data network, the Internet, a wide area network or a local area network. The network 126 serves as a communication medium to various remote devices (e.g., databases, web servers, remote servers, application servers, intermediary servers, client machines, other portable devices).

Figure 5:
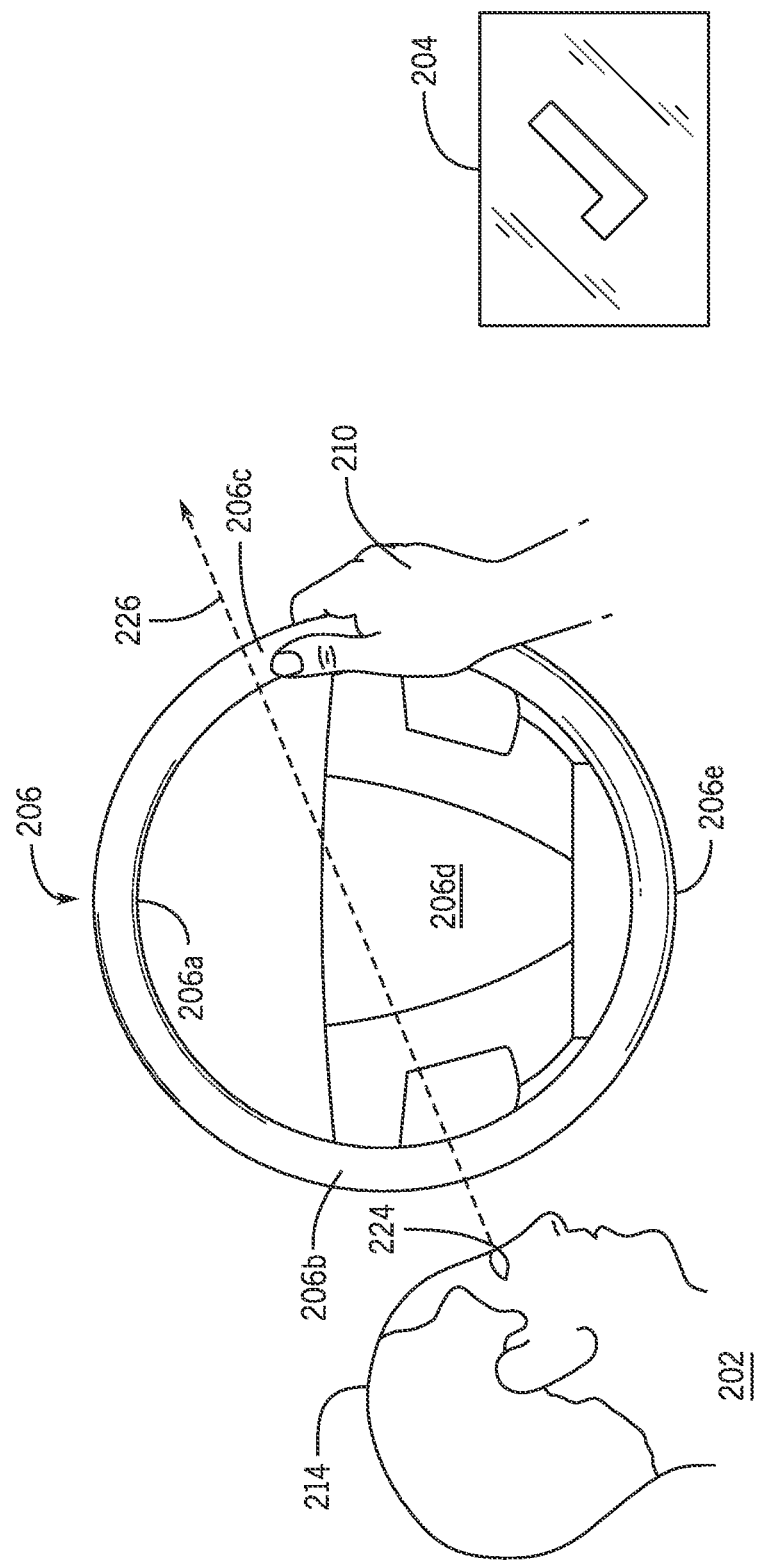
FIG. 5 is a schematic diagram of an illustrative example of controlling a vehicle display with right hand contact on the steering wheel and a head vector directed toward a forward way of the vehicle according to an exemplary embodiment according to an exemplary embodiment.
Figure 6A:
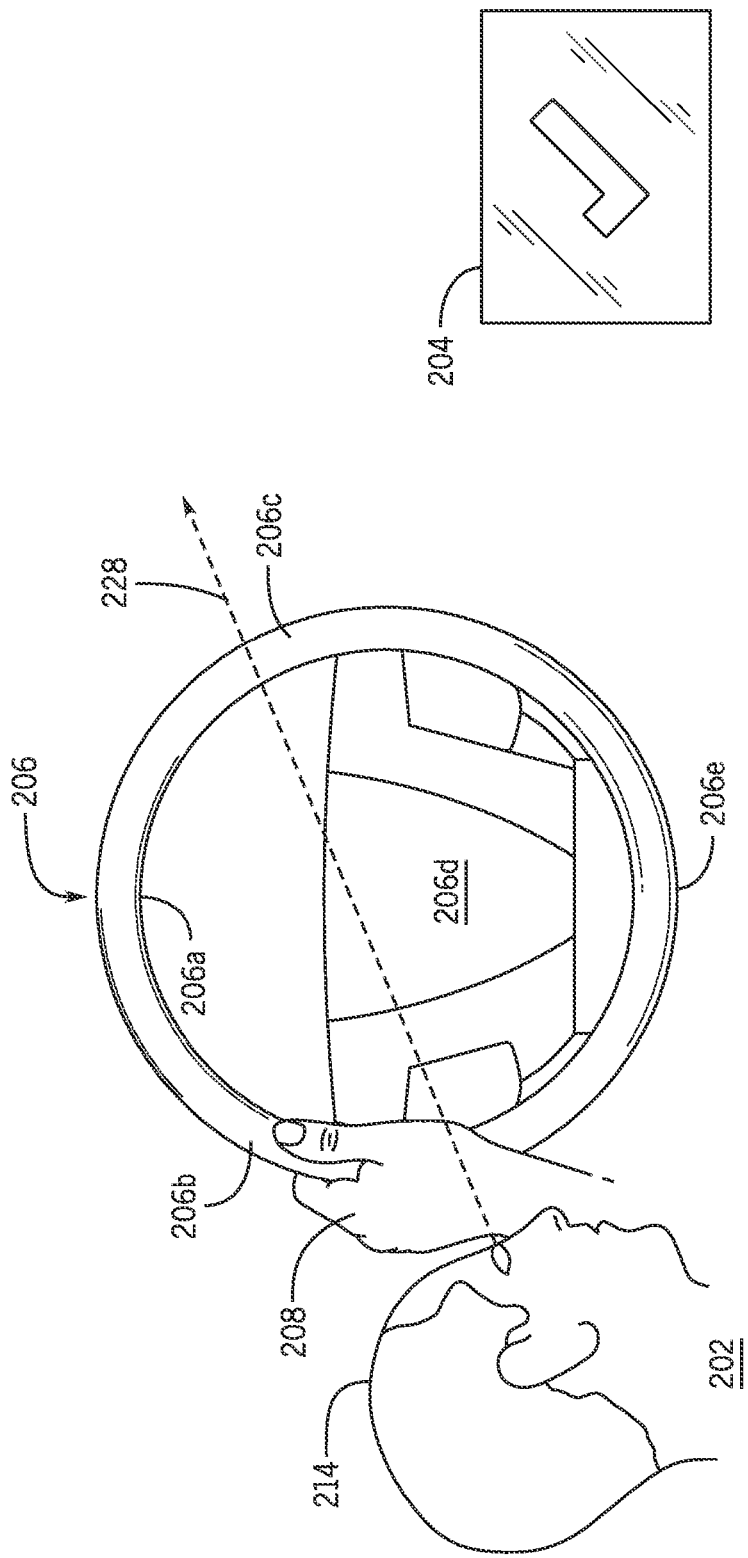
FIG. 6A is a schematic diagram of an illustrative example of controlling a vehicle display with left hand contact on the steering wheel and a head vector directed toward a forward way of the vehicle according to an exemplary embodiment.
Figure 6B:
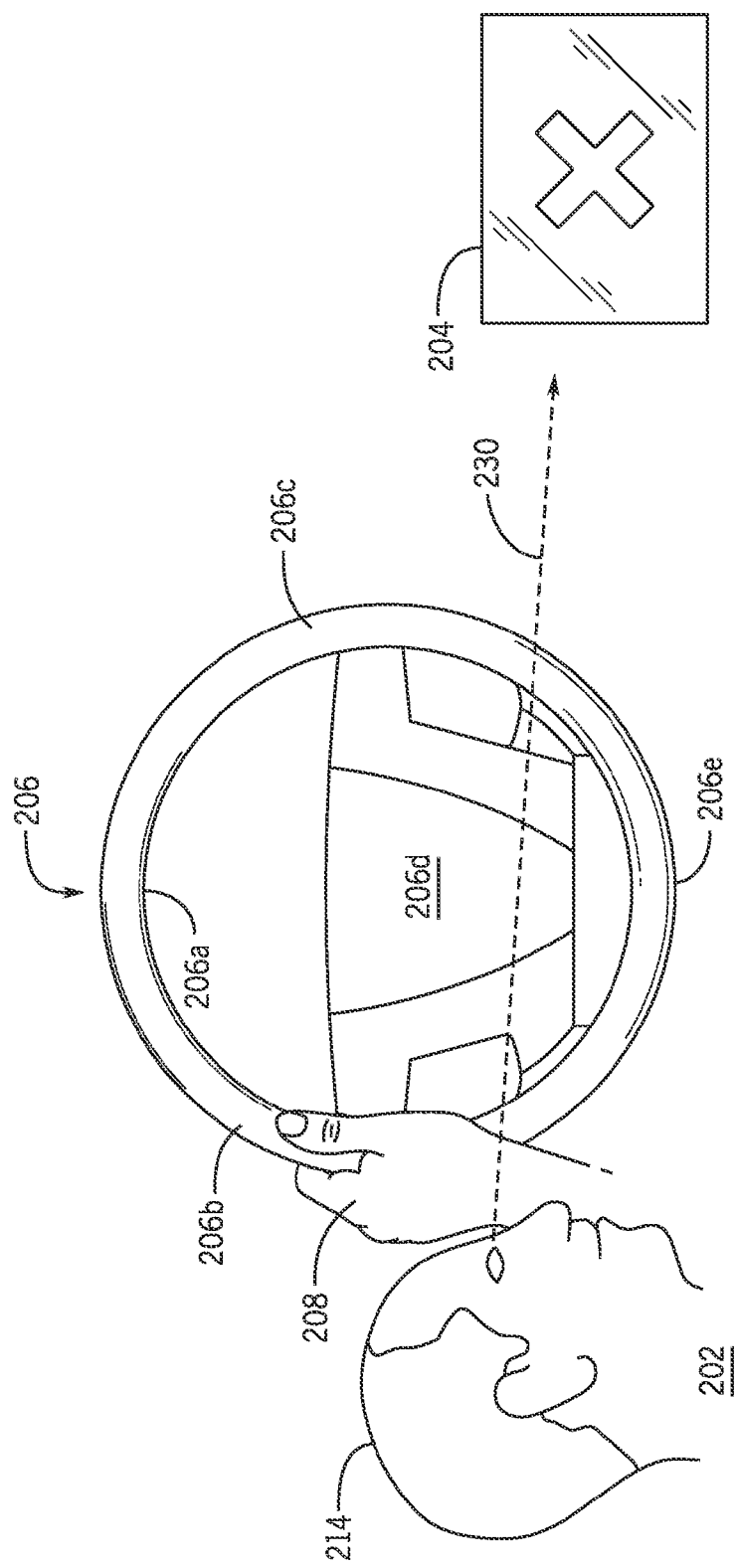
FIG. 6B is a schematic diagram of an illustrative example similar to FIG. 6A, except with a head vector directed to the vehicle display according to an exemplary embodiment.

The system illustrated in FIG. 1 will now be described in operation according to an exemplary embodiment with reference to the components of FIGS. 2, 5, 6A and 6B. FIGS. 5, 6A, and 6B are schematic diagrams of various illustrative examples similar to the schematic diagram of FIG. 2. For simplicity, FIGS. 5, 6A and 6B do not include all components shown in FIG. 2, and like numerals in FIGS. 2, 5, 6A and 6B refer to like parts. Further, it is understood, that the examples discussed herein are illustrative in nature and that other examples and configurations can be implemented with the systems and methods for controlling a vehicle display based on driver behavior.

As mentioned above, the steering wheel 118 can include sensors (not shown) for sensing contact data. The contact data indicates driver contact with the steering wheel. For example, contact data can indicate contact of a left hand or a right hand of the driver with the steering wheel. For example, as shown in FIG. 2, a left hand 208 of the driver 202 is shown gripping the steering wheel 206. Accordingly, the steering wheel 206 can sense (e.g., via sensors (not shown)) contact of the left hand 208 and transmit the contact data to, for example, the processor 104. As another illustrative example, shown in FIG. 5, a right hand 210 of the driver 202 is shown gripping the steering wheel 206. As a further illustrative example, as shown in FIG. 3C, a knee 222 of the driver is shown in contact with the steering wheel 206.

Referring again to FIG. 1, the system also includes the head tracking device 120. The head tracking device 120 determines a head vector of the driver in relation to the vehicle and the vehicle display. For example, in FIG. 2, the head tracking device 120 is shown as an optical sensing device 212. As mentioned above, the optical sensing device 212 can capture and determine a head vector of the driver 202 in relation to the vehicle 200 and the vehicle display 204. The head vector defines a line originating from a head reference point, the line extending in a direction towards a viewing point for a fixation duration.

For example, in FIG. 2, a first head vector 216 is defined as a line originating from a head reference point 224. The first head vector 216 extends in a direction towards a forward way of the vehicle 200 to a viewing point (e.g., the road in front of the vehicle 200). Also shown in FIG. 2, a second head vector 218 extends in a direction towards a viewing point, the vehicle display 204. Thus, the head vector includes a direction of the head vector (e.g., in relation to the vehicle and the vehicle display). The head vector can also include a fixation duration of the head vector. For example, a period of time in which the head vector is directed towards a viewing point. As an illustrative example, in FIG. 2, the second head vector 218, directed towards the vehicle display 204 (e.g., the viewing point) can have a duration of one (1) second indicating the head vector is directed towards the vehicle display 204 for a time period of one (1) second.

Referring again to FIG. 1, and as mentioned above, the system includes a processor 104 operatively connected for computer communication to the vehicle display 116, the steering wheel 118, and the head tracking device 120. The processor 104 includes the vehicle display control module 114 that controls the vehicle display 116 based on the contact data from the steering wheel 118 and the head vector determined and provided from the head tracking device 120. In one embodiment, the vehicle display control module 114 determines a driver state (e.g., attentive, inattentive) based on the contact data from the steering wheel 118, the head vector from the head tracking device 120 and controls the vehicle display 116 based on the driver state.

Exemplary control based on contact data and head vector will now be described with reference to FIGS. 5, 6A and 6B. In FIG. 5, the right hand 210 of the driver 202 is in contact with the steering wheel 206. Additionally, the head vector 226 of the driver 202 defines a line directed toward a forward way of the vehicle. Accordingly, the vehicle display control module 114 controls the vehicle display 204 to enable use of the vehicle display based on the contact data and the head vector. In another example, the vehicle display control module 114 determines the driver 202 is in an attentive state based on the contact data and the head vector, and accordingly the vehicle display control module 114 controls the vehicle display 204 to enable use of the vehicle display 204.

As another example, in FIG. 6A, the left hand 208 of the driver 202 is in contact with the steering wheel 206. A head vector 228 of the driver 202 is directed toward a forward way of the vehicle. Accordingly, the vehicle display control module 114 controls the vehicle display 204 to enable use of the vehicle display 204. In another embodiment, the vehicle display control module 114 determines the driver is attentive based on the contact data and the head vector and accordingly controls the vehicle display 204 to enable use of the vehicle display 204. Conversely, in FIG. 6B, the head vector 230 of the driver 202 is directed toward the vehicle display 204. In this example, if the fixation duration of the head vector meets a predetermined head vector duration threshold, the vehicle display control module 114 controls the vehicle display 204 to disable use of the vehicle display 204. Alternatively, if the fixation duration of the head vector meets a predetermined head vector duration threshold, the vehicle display control module 114 determines the driver is inattentive and controls the vehicle display 204 to disable use of the vehicle display 204.

Further, in some embodiments, when the driver is inattentive, the vehicle display control module 114 can also control the vehicle display 204 to provide visual feedback to the driver thereby reminding the driver to return to the primary task of driving. In other embodiments, other vehicle systems 122 can be controlled to provide feedback to the driver when the driver is inattentive. For example, the processor 104 can control other vehicle systems 122 to provide tactile and/or audio feedback. For example, an infotainment system and/or motivation system (not shown) can provide audio feedback. In another example, an electronic seatbelt pretensioning system (not shown) and/or the steering wheel 118 can provide tactile feedback.

In one embodiment, the system further includes determining a number of head vector sequences based on the head vector (e.g., one or more head vectors over a period of time) and information received from the head tracking device. A head vector sequence, in one embodiment, includes a change between a first head vector with a direction of the first head vector directed to a forward way of the vehicle and a second head vector with a direction of the second head vector directed toward the vehicle display and a fixation duration of the second head vector meets a fixation duration threshold. Thus, the head tracking device 120 can detect a change or a transition from the first head vector to the second head vector and vice versa.

Referring again to FIGS. 6A and 6B, one (1) head vector sequence is illustrated. Specifically, in FIG. 6A a first head vector 228 is directed to a forward way of the vehicle. In FIG. 6B, the head vector of the driver 202 changes and/or transitions to a different direction, specifically, a second head vector 230 is directed to the vehicle display 204. Further, in FIG. 6B, if the fixation duration of the second head vector meets a fixation duration threshold, the vehicle display control module 114 can disable the vehicle display 204. This sequence in head vector directional change resulting in a disabled state of the vehicle display 204 can be defined as one head vector sequence. Said differently, the sequence of the first head vector to the second head vector as shown and described above with FIGS. 6A and 6B is an example of a head vector sequence.

Accordingly, in this embodiment, the vehicle display control module 114 can compare the number of head vector sequences to a head vector sequence threshold, and upon determining the number of head vector sequences meets the head vector sequence threshold, the vehicle control display module 114 disables the vehicle display 204 until an override action is detected. An override action can be a specific driver behavior detected by one or more of the steering wheel 118, the head tracking device 120, and/or the vehicle systems 122. For example, an override action can include detecting contact of the left hand and the right hand of the driver with the steering wheel 118 based on the contact data from the steering wheel 118 (e.g., both hands on the steering wheel as shown in FIG. 3B). This override action indicates the driver 202 has both hands on the steering wheel 118 (e.g., the driver is attentive). It is understood that other override actions, which indicate a driver state as attentive, can also be implemented.

As mentioned above, a predetermined fixation duration threshold can be implemented to determine a driver behavior and/or driver state. The fixation duration threshold can be determined by the vehicle display control module 114. Further, the fixation duration threshold can be modifying dynamically by the vehicle display control module 114. For example, the vehicle control display module 114 can receive information from one or more vehicle systems 122 of the vehicle. The information can indicate a hazard in an area surrounding the vehicle. For example, a blind spot monitoring system can provide information indicating a hazard (e.g., a target vehicle) is in a blind spot area of the vehicle. In another embodiment, a collision mitigation and/or warning system can monitor hazards in an area surrounding a vehicle. For example, a target vehicle preceding the vehicle. Based on this information, the vehicle display control module 114 can increase and/or decrease the fixation duration threshold. Thus, in one example, if a hazard determined, the vehicle display control module 114 can decrease the fixation duration threshold.

Referring now to FIG. 7, a process flow diagram for a method of controlling a vehicle display based on driver behavior according to an exemplary embodiment is shown. FIG. 5 will be described with reference to the systems, components and examples of FIGS. 2, 3, 4, 5, 6A and 6B, though it is understood that the methods described herein can be implemented with other systems, components and examples. At block 702, the method includes receiving contact data from a steering wheel. In one embodiment, the contact data indicates drier contact with the steering wheel. In one embodiment, the contact data can indicate contact between appendages of the driver with the steering wheel. For example, the contact data can indicate contact of a left hand or a right hand of a driver on the steering wheel.

In one embodiment, the processor 104 (e.g., the vehicle display control module 114) can receive contact data indicating contact of a left hand or a right hand of a driver on the steering wheel 118 from the steering wheel 118. As discussed above, the steering wheel 118 can be a touch steering wheel capable of providing contact data, for example, data about the contact and location of the driver's hands with respect to the steering wheel 118 to the processor 104.

At block 704, the method includes determining a head vector of the driver based on information received from a head tracking device. In one embodiment, the head vector defines a line originating from a head reference point and the line extends in a direction towards a viewing point. Further, at block 706, the method includes determining a fixation duration towards the view point based on the head vector and information received from the head tracking device. In some embodiments, the vehicle display control module 114 can determine the fixation duration based on the head vector and information received from the head tracking device 120 or the vehicle display control module 114 can received the fixation duration directly from the head tracking device 120. As discussed above, the fixation duration can be a period of time in which the head vector is focused (e.g., fixated) on the viewing point (e.g., the vehicle display).

At block 708, the method includes controlling the vehicle display based on the contact data, the head vector, and the fixation duration. In another embodiment, controlling the vehicle display includes executing control of the vehicle display based on at least one of the contact data and the head vector. For example, the processor 104 (e.g., the vehicle display control module 114) can control the vehicle display 116 based on the contact data from the steering wheel 118 and the head vector from the head tracking device 120. Based on this information, the processor 104 can transmit a control signal to the vehicle display 116 thereby disabling and/or enabling the vehicle display 116. It is understood that "enabling" and "disabling" the vehicle display as used herein can refer to controlling the operation of the vehicle display and/or the interaction between the vehicle display and the driver. For example, enabling the vehicle display can include turning the vehicle display ON, allowing input to the vehicle display, among others. Disabling the vehicle display can include turning the vehicle display OFF, restricting input to the vehicle display, among others.

In another embodiment, at block 710, the method includes determining a driver state (e.g., attentive, inattentive) based on the contact data and the head vector. For example, the processor 104 (e.g., vehicle display control module 114) can determine the driver state based on the contact data from the steering wheel 118 and the head vector from the head tracking device 120. Accordingly, referring again to block 708, the method can include controlling the vehicle display based on the driver state determined at block 710. For example, the processor 104 (e.g., the vehicle display control module 114) can control the vehicle display 116 based the driver state. In one embodiment, the processor 104 can transmit a control signal, based on the driver state, to the vehicle display 116 thereby disabling and/or enabling the vehicle display 116. For example, if the driver state indicates an attentive driver state, the processor 104 can transmit a control signal to the vehicle display 116 to enable to vehicle display 116. As another example, if the driver state indicates an inattentive driver state, the processor 104 can transmit a control signal to the vehicle display 116 to disable to vehicle display 116.

Specific examples of controlling the vehicle display 116 will now be discussed. Referring now to FIG. 8, and with reference to FIGS. 1, 2, 3A, 3B, 3C, 4, 5, 6A, 6B, and 7, a process flow diagram of a method of controlling a vehicle display based on driver behavior according to another exemplary embodiment is shown. In one embodiment, controlling the vehicle display includes enabling the vehicle display upon determining contact of the right hand on the steering wheel and determining the direction of the head vector of the driver is directed toward a forward way of the vehicle. Accordingly, at block 802, the method includes determining contact of the right or the left hand on the steering wheel. For example, the processor 104 (e.g., vehicle display control module 114) can receive contact data from the steering wheel 118 at block 802 and determine contact of the right or the left hand on the steering wheel 118.

If it is determined that the right hand is in contact with the steering wheel, at block 802, at block 804 it is determined if the direction of the head vector of the driver is directed toward a forward way of the vehicle. For example, the processor 104 (e.g., vehicle display control module 114) can determine a head vector of the driver based on information from the head tracking device 120 at block 704. Based on the determination at block 804, control of the vehicle display is executed (e.g., block 708). For example, if the determination at block 804 is yes, at block 806, the method includes enabling the vehicle display. If the determination at block 804 is no, at block 808, the method includes disabling the vehicle display. Accordingly, the processor 104 can transmit a control signal to the vehicle display 116 to disable and/or enable the vehicle display 116.

As an illustrative example, and referring again to FIG. 5, the right hand 210 of the driver 202 is in contact with the steering wheel 206. Additionally, the head vector 226 is directed toward a forward way of the vehicle. Accordingly, the vehicle display control module 114 controls the vehicle display 204 to enable use of the vehicle display based on the contact data and the head vector. Alternatively, the vehicle display control module 114 determines the driver 202 is in an attentive state based on the contact data and the head vector and accordingly the vehicle display control module 114 controls the vehicle display 204 to enable use of the vehicle display 204.

In a further embodiment, controlling the vehicle display includes disabling the vehicle display upon determining contact of the left hand on the steering wheel, determining the direction of the head vector of the driver is directed toward the vehicle display, and determining the fixation duration of the head vector of the driver meets a fixation duration threshold based on a comparison of the fixation duration of the head vector to a fixation duration threshold. Thus, referring again to FIG. 8, at block 802, if it is determined that the left hand is in contact with the steering wheel, at block 810, it is determined if the direction of the head vector of the driver is directed toward the vehicle display. For example, the processor 104 (e.g., the vehicle display control module 114) can determine a head vector of the driver based on information from the head tracking device 120 at block 704. If the determination at block 810 is no, at block 806 the method includes enabling the vehicle display.

However, if the determination at block 810 is yes, at block 812 the method includes determining if the fixation duration of the head vector of the driver meets a fixation duration threshold based on a comparison of the fixation duration of the head vector to a fixation duration threshold. Thus, the processor 104 (e.g., the vehicle display control module 114) can determine a fixation duration of the head vector of the driver based on information from the head tracking device 120 at block 704. The processor 104 can compare the fixation duration to a fixation duration threshold. The fixation duration threshold can be predetermined and stored, for example, at the memory 106 and/or the disk 108. If the fixation duration meets and/or exceeds the fixation duration threshold, at block 808, the method includes disabling the vehicle display. If the fixation duration does not meets and/or exceed the fixation duration threshold, at block 806, the method includes enabling the vehicle display As an illustrative example, and referring again to FIG. 6B, the head vector 230 of the driver 202 is directed toward the vehicle display 204. In this example, if the fixation duration of the head vector meets a predetermined head vector duration threshold, the vehicle display control module 114 controls the vehicle display 204 to disable use of the vehicle display 204. Alternatively, if the fixation duration of the head vector meets a predetermined head vector duration threshold, the vehicle display control module 114 determines the driver is inattentive and controls the vehicle display 204 to disable use of the vehicle display 204.

Although the above illustrative examples are specific to hand contact, it is appreciated that the methods and examples can also include other types of contact data. For example, as discussed above, FIG. 3C, contact data can include contact of a knee 222 of the driver with the steering wheel 206. Accordingly, in one embodiment, and with reference to the method of FIG. 7, at block 702, the method can include receiving contact data. If it is determined, based on the contact data, that there is no hand contact (e.g., both hands are off the steering wheel) with the steering wheel, at block 708, the method can include disabling use of the vehicle display until an override action is detected as described herein. Similarly, if it is determined based on the contact data, that an appendage, other than the driver's hands (e.g., knee, shoulder, and elbow), are in contact with the steering wheel, at block 708, the method can include disabling use of the vehicle display until an override action is detected as described herein. It is understood that in some embodiments, gesture and body recognition (e.g., via the optical sensing device 212) alone or in addition to the sensors present on the steering wheel can be used to determine contact data, including recognizing a specific appendage of the driver (e.g., knee, shoulder, elbow) are in contact with the steering wheel.

Figure 9A:
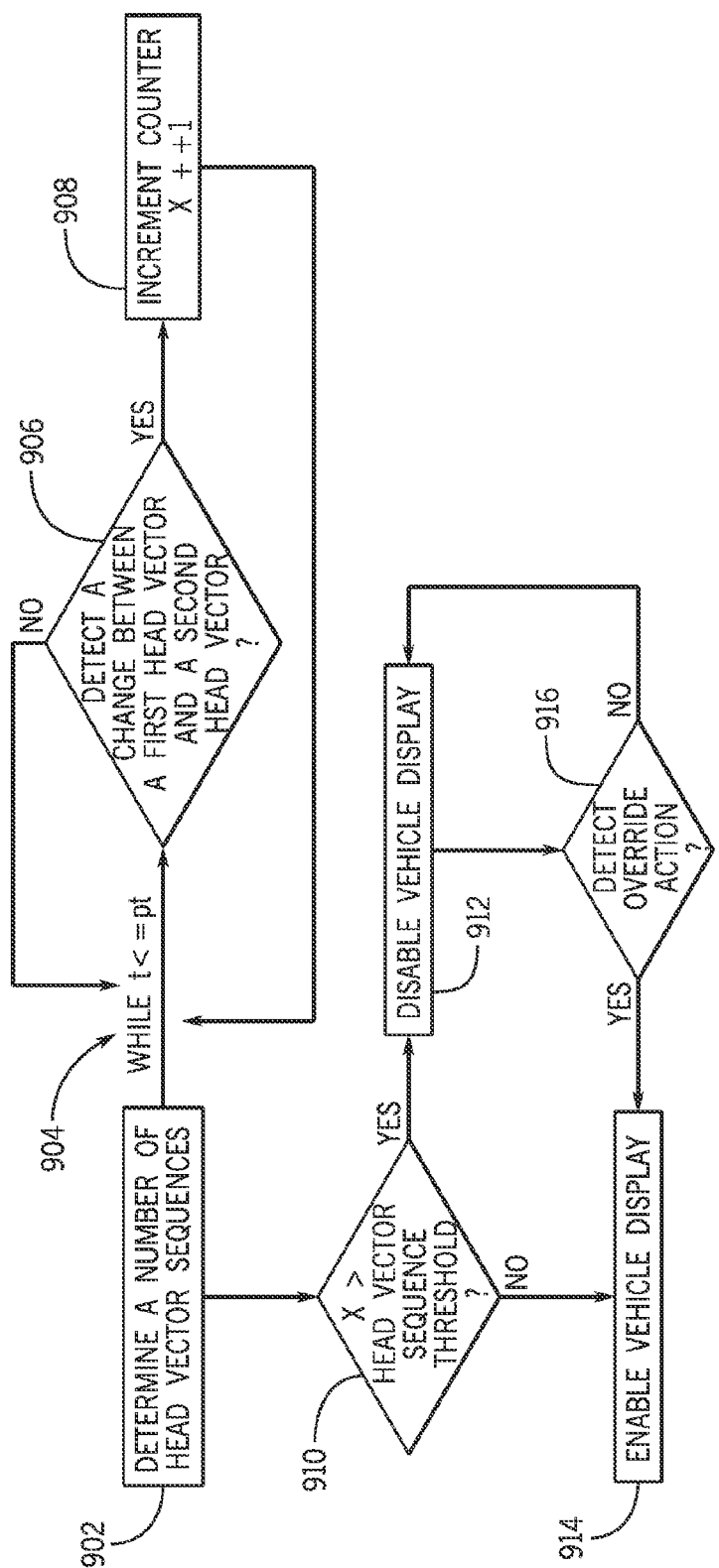
FIG. 9A is a process flow diagram of an illustrative example of the method for controlling a vehicle display based on driver behavior of FIG. 7 based on a number of head vector sequences according to an exemplary embodiment.
Figure 9B:
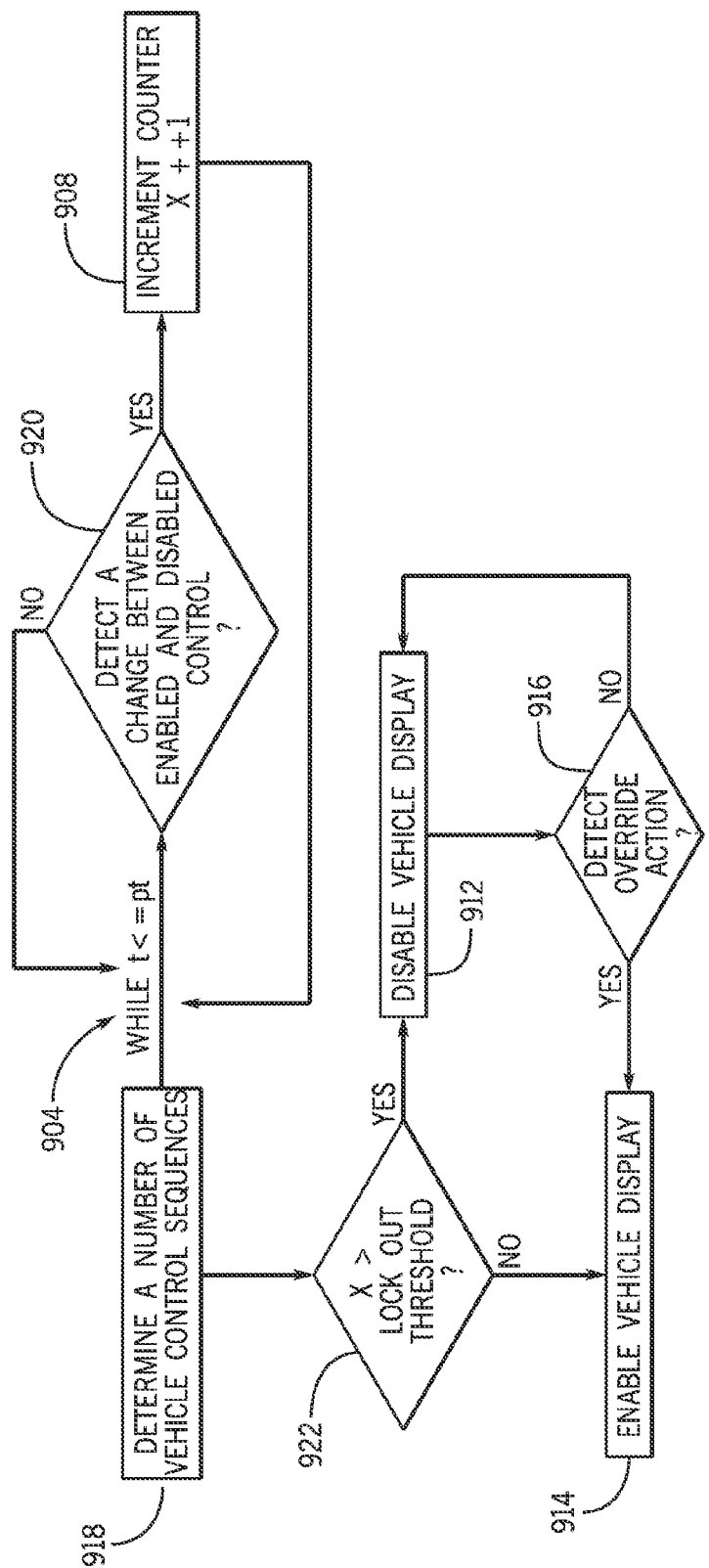
FIG. 9B is a process flow diagram of an illustrative example of the method for controlling a vehicle display based on driver behavior of FIG. 7 and similar to FIG. 9A, except based on a number of vehicle control sequences.

A further example of controlling the vehicle display will now be discussed with reference to FIGS. 9A and 9B, which illustrates a process flow diagram for controlling a vehicle display based on driver behavior according to another exemplary embodiment. Like numerals in FIGS. 7, 8, 9A and 9B represent like process blocks. In one embodiment, determining the head vector further includes determining a number of head vector sequences based on the head vector and information received from the head tracking device. Accordingly, at block 902, the method includes determining a number of head vector sequences. Thus, the processor 104 (e.g., vehicle display control module 114) can determine the number of head vector sequences based on information received from the head tracking device 120. In one embodiment, a head vector sequence includes a change between a first head vector with a direction of the first head vector directed to a forward way of the vehicle and a second head vector with a direction of the second head vector directed toward the vehicle display and a fixation duration of the second head vector meets a fixation duration threshold. Further, the number of head vector sequences can be determined for a specific period of time.

Referring again to FIG. 9A, the number of head vector sequences is determined based on a time t at block 904. Accordingly, while time t is less than or equal to a predetermined time pt, at block 906, the method includes detecting a change between a first head vector with a direction of the first head vector directed to a forward way of the vehicle and a second head vector with a direction of the second head vector directed toward the vehicle display and a duration of the second head vector meets a fixation duration threshold. If the determination at block 906 is yes, at block 908, a counter X is incremented, and the process returns to block 904. If the determination at block 906 is no, the process returns to block 904.

As an illustrative example and referring again to FIGS. 6A and 6B, one (1) head vector sequence is illustrated. Specifically, in FIG. 6A a first head vector 228 with a direction of the first head vector directed to a forward way of the vehicle. In FIG. 6B, the head vector of the driver changes and/or transitions to a different direction, specifically, a second head vector 230 is directed to the vehicle display 204. Further, in FIG. 6B, the fixation duration of the second head vector meets a fixation duration threshold. The sequence of the first head vector to the second head vector as shown and described above with FIGS. 6A and 6B is an example of a head vector sequence.

Referring again to FIG. 9A, at block 910, the method further includes comparing the number of head vector sequences to a head vector sequence threshold. The head vector sequence threshold can be predetermined and stored, for example, at the memory 106 and/or the disk 108. Accordingly, the processor 104 can compare the number of head vector sequences to the head vector sequence threshold. Here, at block 910, if X meets or exceeds the head vector sequence threshold, the method includes controlling the vehicle display to disable use of the vehicle display at block 912 until an override action is detected. Otherwise, if X does not meet or exceed the head vector sequence threshold, the method includes controlling the vehicle display to enable use of the vehicle display at block 914. Thus, control of the vehicle display can be executed based on at least one of the contact data, the head vector, and the number of head vector sequences.

Referring again to block 912, the override action can be defined as a specific driver behavior. In one example, the override action includes detecting contact of the left hand and the right hand of the driver with the steering wheel based on the contact data. Thus, the processor 104 can determine that both hands are in contact with the steering wheel 118 based on the contact data from the steering wheel 118.

Referring now to FIG. 9B, in one embodiment, controlling the vehicle display further includes determining a number of vehicle control sequences over a period of time. Thus, at block 918, the method includes determining a number of vehicle control sequences. A vehicle control sequences includes a sequence of enabling the vehicle display and disabling the vehicle display. Enabling the vehicle display and disabling the vehicle display is based on the contact data and the head vector. Thus, the processor 104 (e.g., the vehicle display control module 114) can determine the number of vehicle control sequences based on information received from the head tracking device 120. In another embodiment, the processor 104 can determine the number of vehicle control sequences based on information received from the vehicle display 116.

Accordingly, in FIG. 9B, the number of vehicle control sequences is determined based on a time t at block 904. Thus, while time t is less than or equal to a predetermined time pt, at block 920, the method includes detecting a change in the enabled and disabled control state of the vehicle display 116. If the determination at block 920 is yes, at block 908, a counter X is incremented, and the process returns to block 904. If the determination at block 920 is no, the process returns to block 904.

At block 922, the method further includes comparing the number of vehicle control sequences to a lock out threshold. The lock out threshold can be predetermined and stored, for example, at the memory 106 and/or the disk 108. Accordingly, the processor 104 can compare the number of vehicle control sequences to the lock out threshold. Here, at block 922, if X meets or exceeds the lock out threshold, the method includes controlling the vehicle display to disable use of the vehicle display at block 912 until an override action is detected. Otherwise, if X does not meet or exceed the lock out threshold, the method includes controlling the vehicle display to enable use of the vehicle display at block 914.

Figure 10:
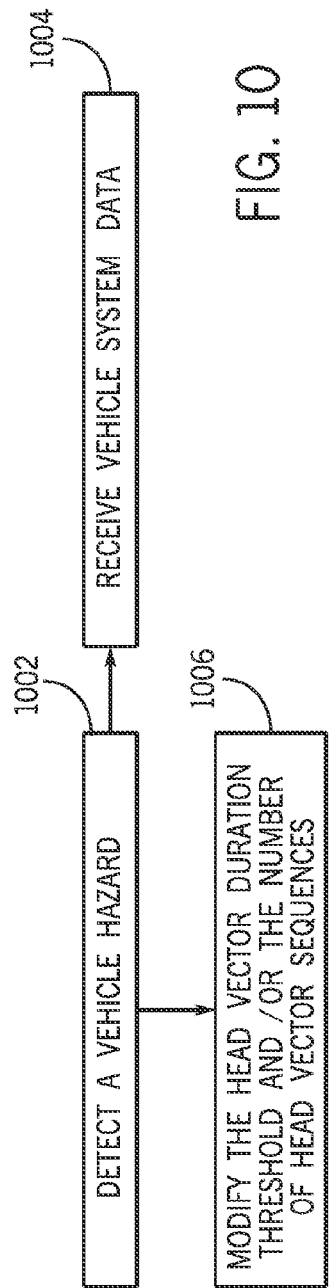
FIG. 10 is a process flow diagram of an illustrative example of a method for modifying a fixation duration threshold according to an exemplary embodiment.

As briefly mentioned above, in some embodiments, the predetermined thresholds (e.g., the fixation duration threshold, the number of head vector sequences, the number of vehicle control sequences) can be dynamically modified based on information from one or more vehicle systems. More specifically, the methods shown in FIGS. 7, 8, 9A, and 9B can further include modifying a fixation duration threshold based on detecting a hazard in an area surrounding the vehicle, wherein detecting the hazard is based on information from one or more vehicle systems of the vehicle. Referring now to FIG. 10, a process flow diagram of a method for modifying a fixation duration threshold according to an exemplary embodiment is shown. At block 1002, the method includes detecting a hazard in an area surrounding the vehicle (e.g., the host vehicle). The hazard can be determined by the processor 104 based on information from the vehicle systems 122. For example, at block 1004, the method can include receiving information from one or more vehicle systems. In another embodiment, the vehicle systems 122 can detect the hazard directly.

A hazard can refer to one or more objects and/or driving scenarios that pose a potential safety threat to a vehicle. For example, a target vehicle traveling in the blind spot of a driver can be considered a hazard since there is some risk of collision between the target vehicle and the host vehicle should the driver turn into the lane of the target vehicle. Additionally, a target vehicle that is traveling in front of a host vehicle at a distance less than a safe headway distance can also be categorized as a hazard. Furthermore, the term hazard is not limited to describing a target vehicle or other remote object. In some cases, for example, the term hazard can be used to describe one or more hazardous driving conditions that increase the likelihood of an accident.

Accordingly, upon detecting a hazard, the predetermined thresholds mentioned herein (e.g., the fixation duration threshold, the number of head vector sequences, the number of vehicle control sequences) are dynamically modified at block 806. In one example, modifying a fixation duration threshold based on detecting a hazard in an area surrounding the vehicle including decreasing the fixation duration threshold based on detecting the hazard. In another example, when the hazard is a target vehicle in front of the vehicle and modifying the fixation duration threshold is based on a headway distance between the vehicle and the target vehicle.

Figure 11A:
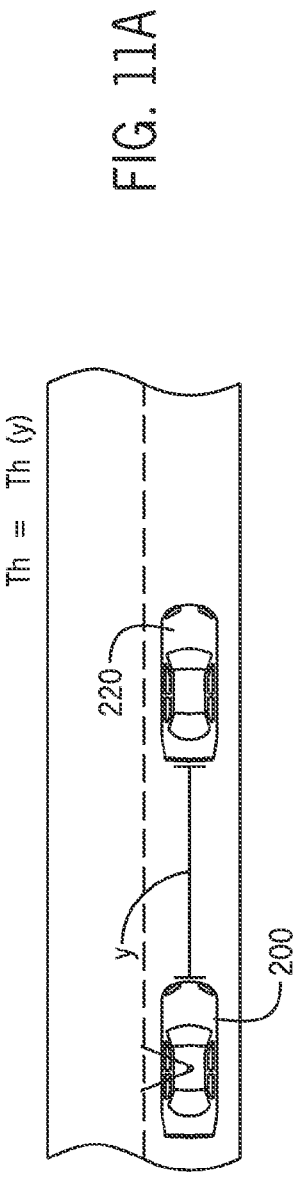
FIG. 11A is a schematic diagram of an illustrative example of a target vehicle and a host vehicle and modifying a fixation duration threshold according to the method of FIG. 10 in an exemplary embodiment.
Figure 11B:
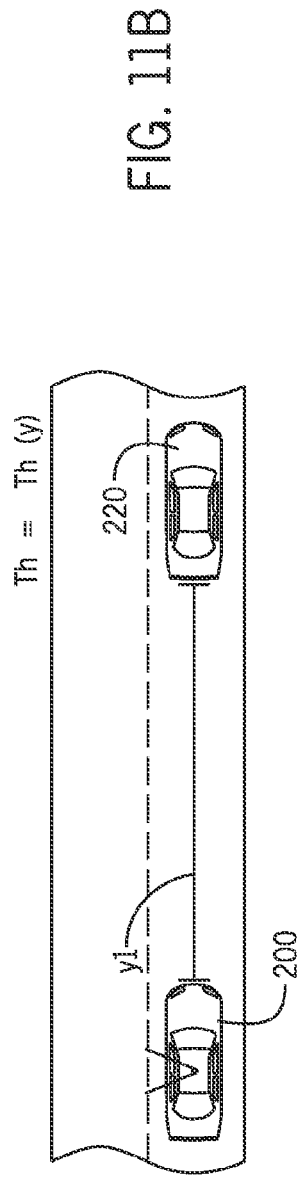
FIG. 11B is a schematic diagram of an illustrative example of a target vehicle and a host vehicle similar to FIG.

Referring now to FIGS. 11A and 11B, illustrative examples of modifying a fixation duration threshold according to the method of FIG. 10. Specifically, FIG. 11A illustrates a vehicle 200 (i.e., the host vehicle) and a target vehicle 220. The target vehicle 220 precedes the vehicle 200 by a distance y. In one embodiment, a vehicle system (e.g., a low speed follow system) can determine that the distance y presents a hazard to the vehicle 200. Accordingly, the vehicle display control module 114 can modify the fixation duration threshold based on the hazard. In FIG. 11A, the fixation duration threshold is determined as a function of the distance y. In FIG. 11B, the vehicle system (e.g., a low speed follow system) can determine that the distance y1 does not present a hazard to the vehicle 200. Accordingly, the fixation duration threshold is not modified. However, it is understood that in some embodiments, the fixation duration threshold can be modified without the detection of a hazard. For example, the fixation duration threshold can be dynamically modified as a function of the distance between the preceding vehicle, regardless as to whether a hazard is present.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling a vehicle display in a vehicle, comprising:
   receiving contact data from a steering wheel, the contact data indicating driver contact with the steering wheel;
   determining a head vector based on information received from a head tracking device, the head vector defining a line originating from a head reference point, the line extending in a direction towards a viewing point;

determining a fixation duration of the head vector towards the viewing point based on the head vector and the information received from the head tracking device, wherein the fixation duration of the head vector is a period of time in which the head vector is directed in the direction towards the viewing point; and upon determining contact of a right hand on the steering wheel based on the contact data, controlling the vehicle display is based on the head vector, and upon determining contact of a left hand on the steering wheel based on the contact data, controlling the vehicle display is based on the head vector and the fixation duration of the head vector.

2. The computer-implemented method of claim 1, wherein controlling the vehicle display includes enabling the vehicle display upon determining contact of a right hand on the steering wheel and determining the direction of the head vector is directed toward a forward way of the vehicle.

3. The computer-implemented method of claim 1, wherein controlling the vehicle display includes disabling the vehicle display upon determining contact of a left hand on the steering wheel, the direction of the head vector is directed toward the vehicle display, and the fixation duration of the head vector meets a fixation duration threshold based on a comparison of the fixation duration of the head vector to the fixation duration threshold.

4. The computer-implemented method of claim 3, wherein controlling the vehicle display includes enabling the vehicle display after disabling the vehicle display upon determining a second head vector, wherein the direction of the second head vector is directed toward a forward way of the vehicle.

5. The computer-implemented method of claim 1, further including modifying a fixation duration threshold based on detecting a hazard in an area surrounding the vehicle, wherein detecting the hazard is based on information from one or more vehicle systems of the vehicle.

6. The computer-implemented method of claim 5, further including decreasing the fixation duration threshold based on detecting the hazard.

7. The computer-implemented method of claim 5, wherein the hazard is a target vehicle in front of the vehicle and modifying the fixation duration threshold is based on a headway distance between the vehicle and the target vehicle.

8. The computer-implemented method of claim 1, wherein determining the head vector further includes determining a number of head vector sequences based on the head vector and information received from the head tracking device, wherein a head vector sequence is a transition of a driver from a first head vector with a direction of the first head vector directed to a forward way of the vehicle and to a second head vector with a direction of the second head vector directed toward the vehicle display and a fixation duration of the second head vector meets a fixation duration threshold.

9. The computer-implemented method of claim 8, further including comparing the number of head vector sequences to a head vector sequence threshold, and upon determining the number of head vector sequences meets the head vector sequence threshold, controlling the vehicle display to disable use of the vehicle display until an override action is detected.

10. The computer-implemented method of claim 9, wherein the override action includes detecting contact of a left hand and a right hand of the driver with the steering wheel based on the contact data.

11. The computer-implemented method of claim 1, wherein controlling the vehicle display further includes determining a number of vehicle control sequences over a period of time, wherein a vehicle control sequences includes a sequence of enabling the vehicle display and disabling the vehicle display and wherein enabling the vehicle display and disabling the vehicle display is based on the contact data and the head vector, and the fixation duration of the head vector.

12. The computer-implemented method of claim 11, further including comparing the number of vehicle control sequences to a lock out threshold and upon determining number of vehicle control sequences meets the lock out threshold, disabling use of the vehicle display until an override action is detected.

13. A system for controlling a vehicle display in a vehicle, comprising:

a steering wheel including sensors for sensing contact data, the contact data indicating driver contact of a left hand or a right hand with the steering wheel;

a head tracking device for determining a head vector of a driver with respect to the vehicle and the vehicle display, wherein the head vector defines a line originating from a head reference point of the driver, the line extending in a direction towards a viewing point of the driver for a fixation duration of the head vector, wherein the fixation duration of the head vector is a period of time in which the head vector is directed in the direction towards the viewing point; and a processor operatively connected for computer communication to the vehicle display, the steering wheel and the head tracking device, the processor including a vehicle control display module for controlling the vehicle display based on the head vector and driver contact of the left hand or the right hand with the steering wheel.

14. The system of claim 13, further including the head tracking device determining a number of head vector sequences based on the head vector and information received from the head tracking device, wherein a head vector sequence is a transition of a driver from a first head vector with a direction of the first head vector directed to a forward way of the vehicle and to a second head vector with a direction of the second head vector directed toward the vehicle display, wherein a fixation duration of the second head vector meets a fixation duration threshold.

15. The system of claim 14, wherein the vehicle control display module compares the number of head vector sequences to a head vector sequence threshold, and upon determining the number of head vector sequences meets the head vector sequence threshold, the vehicle control display module disables the vehicle display until an override action is detected.

16. The system of claim 14, further including receiving information from one or more vehicle systems of the vehicle, the information indicating a hazard in an area surrounding the vehicle, wherein the vehicle control display module modifies the fixation duration threshold based on the hazard.

17. A non-transitory computer readable medium comprising instructions that when executed by a processor perform a method for controlling a vehicle display in a vehicle, comprising:

receiving contact data from a steering wheel, the contact data indicating driver contact with the steering wheel;

determining a head vector of a driver based on information received from a head tracking device, the head vector defining a line originating from a head reference point, the line extending in a direction towards a viewing point for a fixation duration of the head vector;

determining a number of head vector sequences based on the head vector and information received from the head tracking device, wherein a head vector sequence is detected as a first head vector of the driver with a direction of the first head vector directed to a forward way of the vehicle followed in sequence by a second head vector of the driver with a direction of the second head vector directed toward the vehicle display and a fixation duration of the second head vector meets a fixation duration threshold; and executing control of the vehicle display based on at least one of the contact data, the head vector, and the number of head vector sequences.

18. The non-transitory computer readable medium of claim 17, wherein executing control of the vehicle display further includes comparing the number of head vector sequences to a head vector sequence threshold, and upon determining the number of head vector sequences meets the head vector sequence threshold, executing control of the vehicle display to disable use of the vehicle display.

19. The non-transitory computer readable medium of claim 17, wherein executing control of the vehicle display further includes comparing the fixation duration of the head vector to a predetermined head vector duration threshold and executing control of the vehicle display to disable use of the vehicle display upon determining contact of the left hand on the steering wheel, determining the direction of the head vector of the driver is directed toward the vehicle display, and determining the fixation duration of the head vector of the driver meets the fixation duration threshold based on the comparison.

* * * * *